US012538183B2

(12) United States Patent
Huang et al.

(10) Patent No.: US 12,538,183 B2
(45) Date of Patent: Jan. 27, 2026

(54) SYSTEMS AND METHODS FOR DYNAMIC CACHED SERVICE AUTHORIZATION INFORMATION IN A WIRELESS NETWORK

(71) Applicant: Verizon Patent and Licensing Inc., Basking Ridge, NJ (US)

(72) Inventors: Ye Huang, San Ramon, CA (US); Alexander Fadeev, Summit, NJ (US); Shanthala Kuravangi-Thammaiah, Keller, TX (US); Ali Imdad Malik, East Brunswick, NJ (US); Gulay Kurt Chrzanowski, Sudbury, MA (US); John Sangem, Whippany, NJ (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 366 days.

(21) Appl. No.: 18/194,796

(22) Filed: Apr. 3, 2023

(65) Prior Publication Data

US 2024/0334253 A1 Oct. 3, 2024

(51) Int. Cl.
*H04W 28/24* (2009.01)
(52) U.S. Cl.
CPC .................... *H04W 28/24* (2013.01)
(58) Field of Classification Search
None
See application file for complete search history.

(56) References Cited

U.S. PATENT DOCUMENTS

| | | | | |
|---|---|---|---|---|
| 12,294,484 B2* | 5/2025 | Kuo | ...................... | H04W 76/34 |
| 2017/0039144 A1* | 2/2017 | Wang | .................... | G06F 12/126 |
| 2020/0403909 A1* | 12/2020 | Kleyman | ................ | G06F 13/30 |
| 2022/0086225 A1* | 3/2022 | Agarwal | ................. | H04L 67/61 |
| 2022/0141662 A1* | 5/2022 | Liao | ....................... | H04W 12/08 726/1 |
| 2022/0295337 A1* | 9/2022 | Kim | ....................... | H04W 76/14 |
| 2022/0329994 A1* | 10/2022 | El Essaili | ............... | H04L 67/12 |
| 2022/0394540 A1* | 12/2022 | Ahmadi | .................. | H04L 41/12 |
| 2023/0007447 A1* | 1/2023 | Kuo | ....................... | H04W 76/11 |
| 2023/0205449 A1* | 6/2023 | Jeong | .................. | G06F 12/0246 711/118 |
| 2023/0276344 A1* | 8/2023 | Dao | .................. | H04M 15/8016 370/329 |
| 2024/0064558 A1* | 2/2024 | Gangakhedkar | .. | H04W 28/0268 |
| 2024/0121655 A1* | 4/2024 | Huang | .............. | H04W 28/0268 |
| 2024/0284259 A1* | 8/2024 | Ji | ....................... | H04W 28/0268 |

* cited by examiner

*Primary Examiner* — Phirin Sam

(57) ABSTRACT

A system described herein may receive a request for Quality of Service ("QoS") parameter information associated with a particular User Equipment ("UE"). The system may include an exposure element of a core of a wireless network, such as a Network Exposure Function ("NEF") or a Service Capability Exposure Function ("SCEF"). The system may indicate, to a user information repository of the wireless network, such as a Unified Data Management function ("UDM") or a Unified Data Repository ("UDR"), that QoS parameter information associated with the particular UE should be provided. The system may receive, based on the indicating, particular QoS parameter information associated with the particular UE, and may output the received particular QoS parameter information associated with the particular UE in response to the request or may push such information as the QoS parameter information is updated.

20 Claims, 11 Drawing Sheets

201

| UE ID | Services/QoS parameters | Endpoint ID |
|---|---|---|
| UE_A (e.g., UE 107) | {QoS_A} | Endpoint_A (e.g., SPS 101) |
| UE_B | {QoS_B} | Endpoint_A |
| UE_B | {QoS_C} | Endpoint_B |
| UE_C | {QoS_A} | {Any} |

| UE ID | Services/QoS parameters |
|---|---|
| UE_A (e.g., UE 107) | {QoS_A} |
| UE_B | {QoS_X} |
| {Group_A} | {QoS_Y} |

FIG. 3

SYSTEMS AND METHODS FOR DYNAMIC CACHED SERVICE AUTHORIZATION INFORMATION IN A WIRELESS NETWORK

BACKGROUND

Wireless networks may provide connectivity between User Equipment ("UEs"), such as mobile telephones, tablets, Internet of Things ("IoT") devices, etc. and other devices or systems such as application servers, content providers, or the like. Different types of services may be associated with different Quality of Service ("QoS") parameters, such as maximum latency thresholds, minimum throughput thresholds, or other such parameters. For example, a gaming service or a voice call service may be associated with respective maximum latency thresholds, while a file download service or a content streaming service may be associated with respective minimum throughput thresholds.

BRIEF DESCRIPTION OF THE DRAWINGS

FIGS. 2 and 3 illustrate example data structures that may be maintained, in accordance with some embodiments;

DETAILED DESCRIPTION OF EXAMPLE EMBODIMENTS

Figure 1:
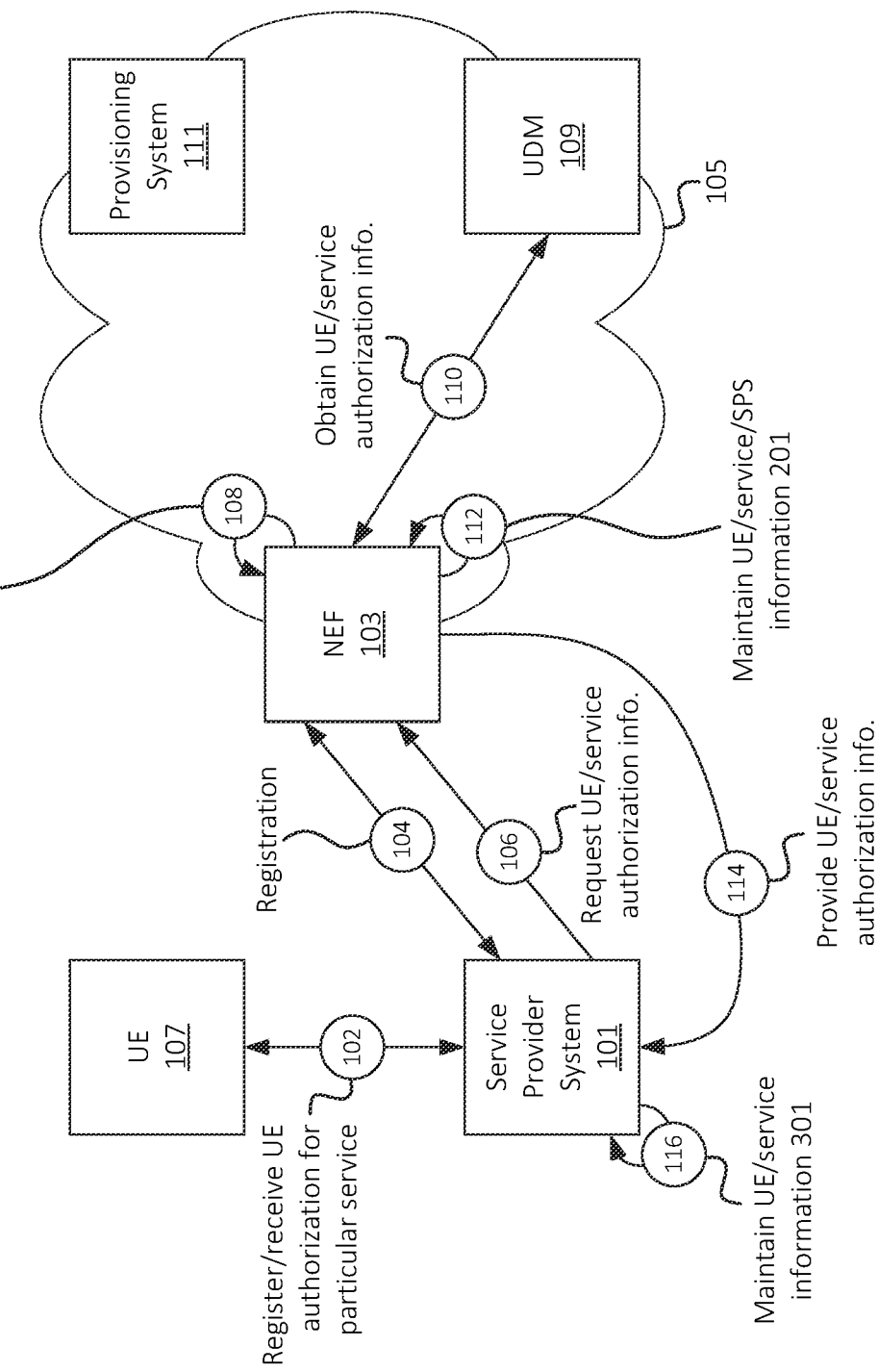
FIG. 1 illustrates an example overview of one or more embodiments described herein.

The following detailed description refers to the accompanying drawings. The same reference numbers in different drawings may identify the same or similar elements.

Various services, applications, traffic types, etc. (referred to herein simply as "services" for the sake of brevity), may be associated with different QoS parameters, such as thresholds, Service Level Agreement ("SLAs"), or the like. Service providers, such as application servers, content provider systems, or other types of devices or systems that deliver such services to a UE via network, may provide such services in accordance with QoS parameters that are provided to the UE via the network. Accordingly, service providers may communicate with the network to request, query, verify, or otherwise determine QoS parameters that are provided to the UE via the network. Such service providers may tailor the services provided to the UE via the network based on the QoS parameters that are provided to the UE via the network. For example, the service provider may send traffic to the UE less frequently in situations where the UE is receiving relatively lower throughput QoS parameters via the network, and may send traffic to the UE more frequently in situations where the UE is receiving relatively higher throughput QoS parameters via the network. As another example, the service provider may provide alerts to the UE in situations where the network is not providing at least a threshold measure of performance to the UE, where such threshold measure of performance may be associated with a particular service provided to the UE by the service provider.

As discussed herein, a wireless network may include an external interface, exposure element, etc. (e.g., a Network Exposure Function ("NEF"), a Service Capability Exposure Function ("SCEF"), or other suitable device or system—referred to herein simply as "NEF" for the sake of brevity) that communicates with devices or systems that are external to the wireless network, such as one or more service provider systems, in order to provide QoS parameters associated with one or more UEs. As discussed herein, in some embodiments, the NEF may cache or otherwise maintain QoS parameter information associated with a particular set of UEs, services, and/or service provider systems, such that the NEF is able to provide the information without reactively querying one or more other elements of the wireless network (e.g., a Unified Data Management function ("UDM"), a Unified Data Repository ("UDR"), a Home Subscriber Server ("HSS"), or other suitable device or system—referred to herein simply as "UDM" for the sake of brevity). In this manner, the NEF may be able to more quickly respond to information requests (e.g., requests from a service provider system for QoS parameters associated with a given UE) than if the NEF were to reactively determine the requested information in response to receiving such requests. Further, as the quantity of such requests may be relatively large, the caching of such information by the NEF may reduce the amount of network resources that would otherwise be consumed in requesting such information from other elements of the wireless network. Additionally, as discussed herein, the NEF may maintain QoS parameter information for a subset of UEs for which the wireless network maintains information (e.g., UEs associated with a particular set of services or service provider systems), and therefore is not necessitated to maintain all information associated with all UEs for which elements of the wireless network (e.g., a UDM) maintain information.

As shown in FIG. 1, Service Provider System ("SPS") 101 may register (at 102) with NEF 103 of wireless network 105. SPS 101 may be, may include, may be communicatively coupled to, and/or otherwise may be associated with a device or system that provides services to one or more UEs 107 via wireless network 105. For example, SPS 101 may provide a voice call service, a videoconferencing service, a gaming service, a content streaming service, a file transfer service, and/or other suitable type of service. Generally, SPS 101 may provide the service by sending and/or receiving traffic to and/or from UE 107 via wireless network 105, performing computations or processing relating to the service, maintaining or providing information relating to the service, and/or performing other suitable operations.

In some embodiments, SPS 101 may register (at 102) with UE 107 for a particular service. The registration (at 102) may include SPS 101 may communicating with UE 107 via an application programming interface ("API"), a web portal, an application executing at UE 107 (e.g., a client-side application, where SPS 101 executes or includes a corresponding server-side application), and/or other suitable communication pathway. The registration (at 102) may include receiving authorization from UE 107 (e.g., from a user of UE 107) for SPS 101 to provide the service to UE 107, which may include receiving user consent for UE 107 to provide information to SPS 101 (e.g., UE information such as location information, usage information, etc.) and/or to otherwise receive the service from SPS 101. SPS 101 may receive or otherwise determine an identifier of UE 107 or a user thereof, such as a user name or "handle," a device identifier, an Mobile Directory Number ("MDN"), an Internet Protocol ("IP") address, an International Mobile Station Equipment Identity ("IMEI") value, an International Mobile Subscriber Identity ("IMSI") value, a Subscription Permanent Identifier ("SUPI"), a Globally Unique Temporary Identifier ("GUTI"), or other suitable identifier of UE 107 or a user thereof. In some embodiments, UE 107 and SPS 101 may establish one or more authentication mechanisms (e.g., may exchange or establish one or more cryptographic keys, user names, passwords, authentication tokens, etc.), by which UE 107 may authenticate communications from SPS 101 and vice versa.

In this manner, SPS 101 may maintain information associating UE 107 with one or more services provided by SPS 101. In the event that SPS 101 provides multiple services (e.g., a voice call service and a file transfer service), the registration (at 102) may include authorizing or associating UE 107 with a subset of such services (e.g., only the voice call service and not the file transfer service). In this manner, SPSs 101 with diverse sets of services may utilize the techniques described herein in a granular fashion that is based on the association of particular UEs 107 with particular services.

In some embodiments, one or more of the services provided by SPS 101 may be associated with a respective set of QoS parameters, SLAs, network slices, etc. associated with wireless network 105. For example, a voice call service offered by SPS 101 may be associated with a first set of QoS parameters (e.g., SLAs, network slices, etc.) of wireless network 105 (e.g., where such QoS parameters offer relatively low latency or other QoS parameters suitable for voice calls), a content streaming service offered by SPS 101 may be associated with a second set of QoS parameters (e.g., SLAs, network slices, etc.) of wireless network 105, and so on. In some embodiments, SPS 101 may maintain a mapping or other information correlating the types of services offered by SPS 101 to the QoS parameters of wireless network 105. Additionally, or alternatively, NEF 103 and/or some other suitable device or system may maintain such mapping or correlation information.

As further shown, SPS 101 may also register (at 104) with NEF 103 of wireless network 105. SPS 101 and NEF 103 may communicate, for example, via an API or other suitable communication pathway. The registration (at 104) of SPS 101 with NEF 103 may include the establishment of one or more authentication techniques, the establishment of permissions or authorizations for SPS 101 (e.g., operations that SPS 101 is authorized to perform, requests that SPS 101 is authorized to make, etc.), such as authorization to perform some or all of the operations described below. In some embodiments, the registration (at 104) may include the establishment of the mapping or correlation information described above, in which service types associated with SPS 101 are associated with respective QoS parameters associated with wireless network 105.

SPS 101 may request (at 106) information from NEF 103, indicating whether UE 107 is authorized for a particular service (or corresponding set of QoS parameters). For example, SPS 101 may request confirmation that UE 107 is authorized to receive a service (and/or is authorized to receive corresponding QoS parameters) via wireless network 105, for which UE 107 has previously registered (at 102) with SPS 101. Based on receiving (at 106) the request for information from SPS 101, NEF 103 may determine (at 108) whether NEF 103 locally maintains information indicating whether UE 107 is authorized to receive the particular service, and/or is authorized to receive QoS parameters corresponding to the particular service. As discussed herein, NEF 103 may, in some circumstances, maintain such information "locally," inasmuch as NEF 103 may not need to request the information from one or more other elements of wireless network 105, such as a UDM. In this example, assume that NEF 103 does not locally maintain such information.

Based on determining that NEF 103 does not locally maintain the information indicating whether UE 107 is authorized to receive the particular service, NEF 103 may further subscribe (at 108) to updates associated with UE 107 (e.g., updates indicating whether UE 107 is authorized to receive the particular service or other services). The "subscribing" may include outputting, to one or more other elements of wireless network 105 (e.g., via a service mesh, a routing mesh, via one or more Service-Based Interfaces ("SBIs"), etc.), such as to UDM 109, an indication that updated information associated with UE 107, the particular service, and/or the particular SPS 101 should be "pushed" to NEF 103.

Additionally, based on determining (at 108) that NEF 103 does not locally maintain the requested (at 106) information (e.g., a "cache miss"), NEF 103 may obtain (at 110) information from one or more other elements of wireless network 105, such as UDM 109, indicating whether UE 107 is authorized to receive the particular service (and/or is authorized to receive QoS parameters of wireless network 105 that correspond to the particular service). UDM 109 may, for example, maintain information indicating QoS parameters authorized for UE 107, such as network slices, SLAs, or other suitable QoS parameters. In some embodiments, the information maintained by UDM 109 may have been received from provisioning system 111, an administrator, or some other source. Provisioning system 111 may, for example, be associated with an operator or administrator of network 105, and may indicate, to UE 107, UDM 109, and/or other devices or systems, particular QoS parameters or other parameters with which UE 107 is associated or authorized.

In this example, assume that UE 107 is authorized to receive the particular service (e.g., is authorized to receive particular QoS parameters of wireless network 105 that correspond to the particular service). NEF 103 may maintain (at 112) information indicating that UE 107 is authorized to receive the particular service, and/or is authorized to receive a set of QoS parameters that correspond to the particular service.

FIG. 2 illustrates an example data structure 201 that may be maintained by NEF 103, in some embodiments. As shown, data structure 201 may indicate particular sets of QoS parameters for which one or more different UEs are authorized or otherwise associated. Data structure 201 may include identifiers of one or more such UEs (e.g., IP addresses, MDNs, IMEI values, or other suitable identifiers), as well as indications of particular services and/or sets of QoS parameters with which such UEs are associated. For example, a first UE (denoted as "UE_A," which may refer to example UE 107 shown in FIG. 1) may be authorized for a first set of QoS parameters (denoted as "QoS_A"). As noted above, the set of QoS parameters may include a network slice (e.g., a network slice identifier such as a Network Slice Selection Assistance Information ("NSSAI") value), a set of thresholds (e.g., maximum latency thresholds, minimum throughput thresholds, etc.), SLAs, QoS markers or indicators (e.g., 5G QoS Identifier ("5QI") values, QoS Class Identifier ("QCI") values, etc.), and/or other suitable QoS parameters.

In some embodiments, the QoS parameters for the same UE may be different for different endpoints (e.g., different service providers or other communication endpoints). For example, as shown, another UE (e.g., UE_B) may be associated with one set of QoS parameters (e.g., "QoS_B") when receiving service from one endpoint (denoted as "Endpoint_A," which may refer to SPS 101 of FIG. 1), while such UE may be associated with a different set of QoS parameters (e.g., "QoS_C") when receiving service from another endpoint (denoted as "Endpoint_B"). Furthermore, different UEs may be authorized for different sets of QoS parameters when receiving service from, or communicating with, the same endpoint. For example, UE_A may be authorized for one set of QoS parameters (e.g., QoS_A) when receiving service from Endpoint_A, while UE_B may be authorized for a different set of QoS parameters (e.g., QoS_B) when receiving service from the same Endpoint_A. On the other hand, in some embodiments, data structure 201 may include QoS parameters for a given UE without specifying particular endpoints for which such QoS parameters are authorized. For example, UE_C may be authorized for a particular set of QoS parameters (e.g., QoS_A) regardless of which device or system is providing service to UE_C. As discussed above, the information maintained in data structure 201 may have been received from UDM 109 or some other suitable source.

Returning to FIG. 1, NEF 103 may respond (at 114) to the request (received at 106) from SPS 101 with information indicating that UE 107 is authorized for the particular service, and/or for QoS parameters corresponding to the particular service. SPS 101 may updated or maintain (at 116) information indicating that UE 107 is authorized to receive the particular service, such as in data structure 301 shown in FIG. 3. As shown, data structure 301 may indicate particular QoS parameters, of wireless network 105, for which various UEs (including UE 107) are authorized. Additionally, or alternatively, data structure 301 may include information indicating particular services, offered by SPS 101, that correspond to respective QoS parameters for which such UEs are authorized. For example, if NEF 103 indicates (at 114) that UE 107 is authorized to receive QoS parameters that include a relatively low latency, data structure 301 may include information indicating that UE 107 is authorized or is otherwise capable to receive a voice call service or a gaming service (e.g., services associated with relatively low latency communications) from SPS 101.

As further shown, data structure 301 may include different QoS parameters for different UEs, which may be based on differing services offered by SPS 101 and/or based on differing levels of authorized QoS parameters as indicated (e.g., at 114) by NEF 103. Further, in some embodiments, data structure 301 may include QoS and/or service authorization information for a group of UEs (e.g., "Group_A"), which may include a category of UEs, a specified set of UEs, and/or other criteria based on which multiple UEs may be identified.

Figure 4:
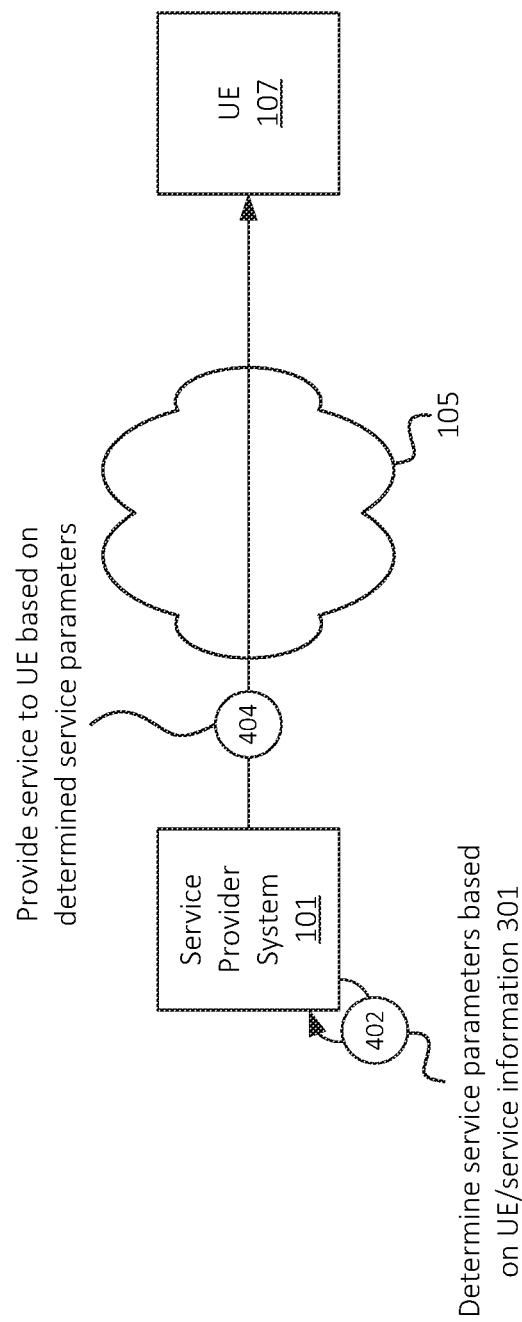
FIG. 4 illustrates an example of a service provider providing a service in accordance with a particular set of QoS parameters, in accordance with some embodiments.

As shown in FIG. 4, once SPS 101 has received information indicating particular QoS parameters of wireless network 105 for which UE 107 is authorized, SPS 101 may determine (at 402) service parameters associated with one or more services to provide to UE 107. For example, as discussed above, SPS 101 may tailor parameters of such services provided to UE 107, which may include adjusting or configuring bitrates, adjusting file sizes, adjusting or selecting video or audio codecs, and/or other parameters of one or more services provided by SPS 101. SPS 101 may accordingly provide (at 404) the one or more services, as configured based on the received information indicating the QoS parameters for which UE 107 is authorized, to UE 107 via wireless network 105. In this manner, the parameters of the service provided by SPS 101 may be determined based on the manner in which traffic associated with the service is sent and/or received via network 105 (e.g., based on QoS parameters for which UE 107 and/or SPS 101 is/are authorized), thus enhancing the quality of the service provided.

Figure 5:
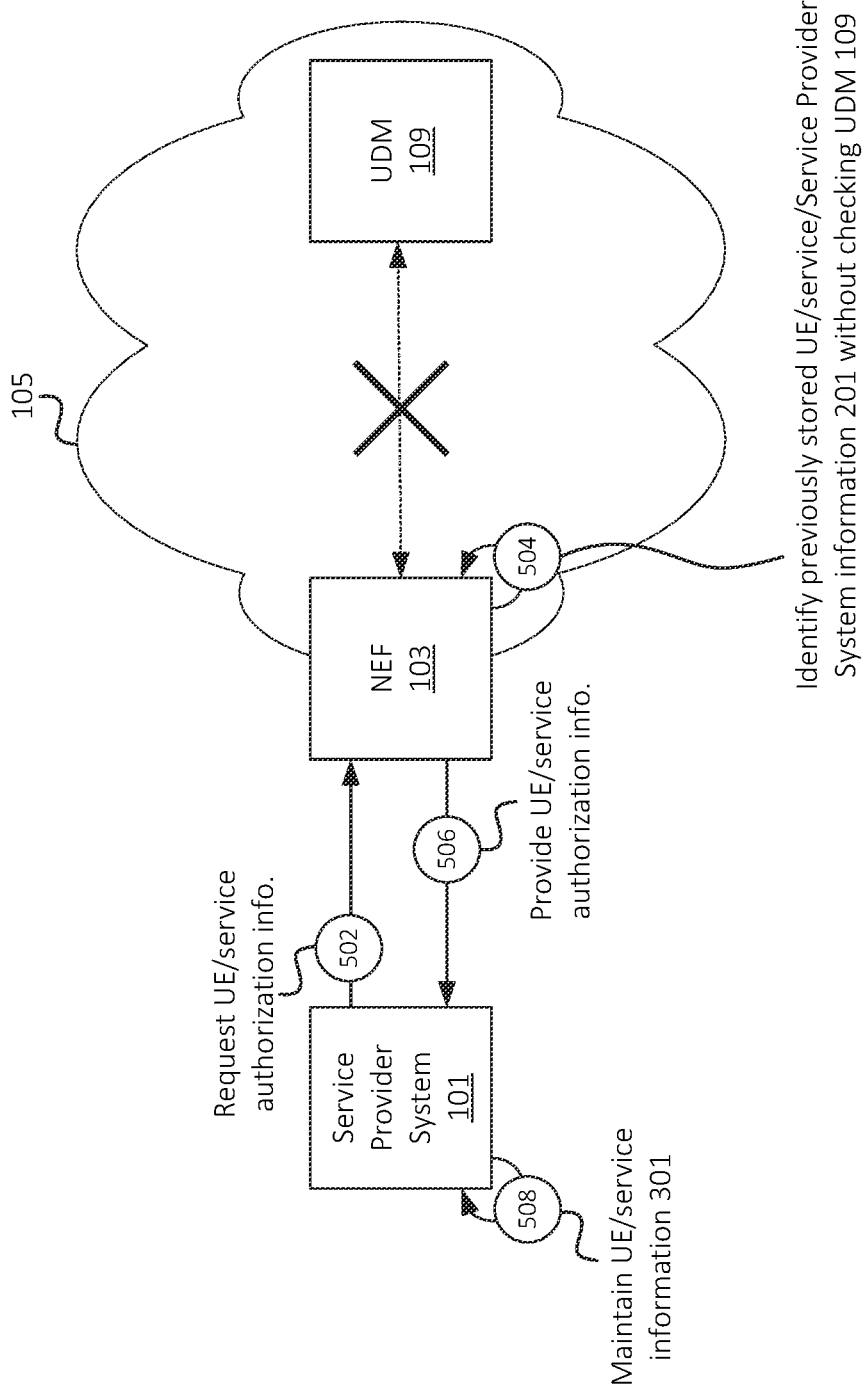
FIG. 5 illustrates an example of cached QoS information being provided without requesting such information from a user information repository of a core network, in accordance with some embodiments.

As discussed above, the maintaining of the information indicating the authorization of particular UEs and/or service providers with respective QoS parameters (e.g., as discussed above with respect to data structure 201) may allow for a less resource-intensive and faster response to queries (e.g., from SPS 101 and/or other sources) for QoS parameter information pertaining to particular UEs and/or service providers. For example, as shown in FIG. 5, SPS 101 may request (at 502) information from NEF 103 indicating whether a particular UE is authorized for a particular service or set of QoS parameters. For example, SPS 101 may issue a subsequent request for the same UE 107, such as in situations where UE 107 has initiated requests for the service on multiple occasions (e.g., multiple gaming sessions over the course of a week, multiple voice calls, etc.). Similarly, SPS 101 may issue subsequent requests for the same UE 107 when SPS 101 has determined that the service should be provided to UE 107 on multiple occasions, such as when incoming multiple voice calls have initiated for UE 107, when SPS 101 has determined that files or messages should be "pushed" to UE 107, etc. Further, different service providers may request information associated with the same UE 107, such as a first SPS 101 that is associated with a voice call service and a second SPS 101 that is associated with a content streaming service.

In this example, NEF 103 may identify (at 504) that NEF 103 maintains (e.g., in data structure 201 or in some other suitable manner) the requested authorization information for the particular UE (e.g., a "cache hit"). In this scenario, NEF 103 may locally identify the requested authorization information, without communicating with UDM 109 or other elements of wireless network 105, thus conserving time and resources (e.g., network resources) that would otherwise be consumed in querying UDM 109 for such information. For example, as discussed above, NEF 103 may have previously obtained such information based on a request from the same SPS 101 or a different SPS 101.

NEF 103 may provide (at 506) the requested information indicating whether UE 107 is authorized to receive the particular service and/or a corresponding set of QoS parameters, and SPS 101 may maintain and/or update (at 508) information (e.g., as discussed above with respect to data structure 301) indicating the authorization of such UE 107 for the requested service or set of QoS parameters. As discussed above with respect to FIG. 4, SPS 101 may proceed to configure (at 402) one or more services based on the received information, and may provide (at 404) the service via wireless network 105.

Figure 6:
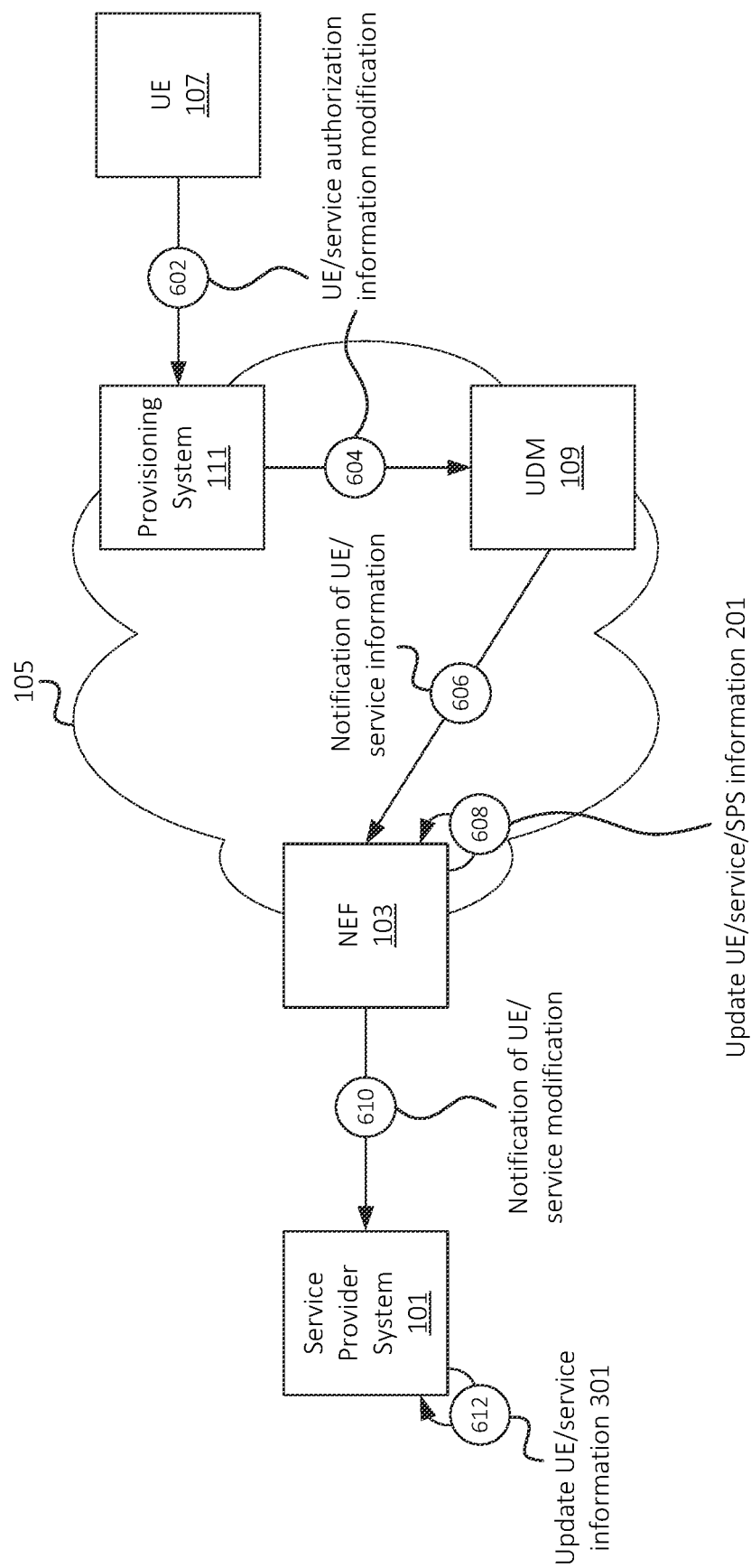
FIG. 6 illustrates an example of dynamically providing updated QoS information associated with a UE, in accordance with some embodiments.

Since NEF 103 subscribes (e.g., at 108) to information associated with a particular UE, service, or SPS 101, NEF 103 may receive updates to such information in real time or near-real time. In this manner, the information (e.g., data structure 201) maintained by NEF 103 may remain up-to-date, in relation to information maintained by UDM 109 and/or other suitable element of wireless network 105. For example, as shown in FIG. 6, provisioning system 111 may receive (at 602) a modification to QoS parameters or services for which a particular UE 107 is authorized. The update may be received from UE 107, a user of UE 107, an administrator or operator of wireless network 105, and/or other suitable source. UDM 109 may accordingly receive (at 604) the updated authorization information from provisioning system 111 or some other suitable source, and may update information by UDM 109 to reflect the received modification. UDM 109 may further notify (at 606) NEF 103 of the modification, which may be based on the subscription (e.g., at 108) of NEF 103 for updates to information associated with UE 107.

Similar concepts may apply when the updated information received (at 604) by UDM 109 indicates modifications to a particular service or a particular service provider. For example, in some embodiments, the updated information may indicate that UE 107, which was previously authorized to receive a first set of QoS parameters when communicating with (e.g., receiving service from) SPS 101, is not authorized to receive a different second set of QoS parameters when communicating with SPS 101.

NEF 103 may accordingly update (at 608) locally maintained information (e.g., data structure 201) based on the received notification. In this manner, NEF 103 may act as a dynamic cache for information indicating particular services and/or QoS parameters for which a given UE 107 and/or SPS 101 is authorized, where NEF 103 remains up-to-date on such information based on subscribing to updates from UDM 109 and/or other suitable devices or systems when the information is changed.

In some embodiments, NEF 103 may further identify one or more service providers or other devices or systems with which the updated information is associated. For example, NEF 103 may receive updated information for UE 107, and may determine (e.g., based on data structure 201) that NEF 103 maintains authorization information for services provided to UE 107 by SPS 101. Since information associated with a service provided by SPS 101 to UE 107 has been modified, NEF 103 may notify (at 610) the particular SPS 101 with the updated information associated with UE 107. SPS 101 may accordingly update (at 612) information associated with services provided by SPS 101 to UE 107 (e.g., data structure 301). Based on the updated (at 612) information associated with services provided to UE 107, SPS 101 may modify parameters of the service (e.g., adjust bitrates, select different codecs, etc.) when providing the services to UE 107. In this manner, SPS 101 may remain up-to-date regarding QoS parameters provided to UE 107, to which SPS 101 provides services via wireless network 105.

Figure 7:
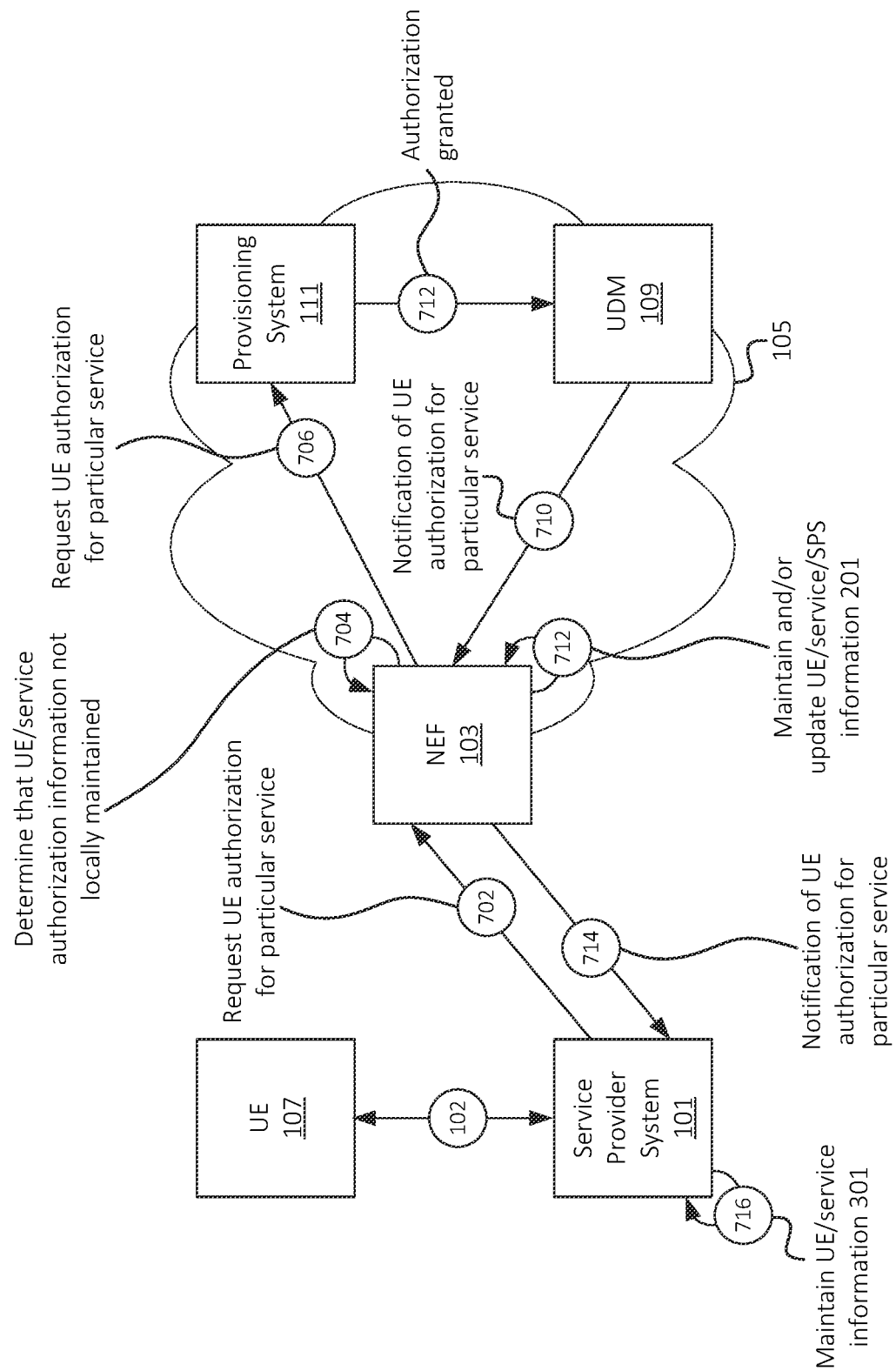
FIG. 7 illustrates an example of modifying QoS information associated with a UE, in accordance with some embodiments.

As shown in FIG. 7, SPS 101 may, in some embodiments, request authorization for a particular service or set of QoS parameters to be provided to UE 107 via wireless network 105. For example, as similarly discussed above, UE 107 and SPS 101 may communicate (at 102) to register UE 107 for a particular service provided by SPS 101. SPS 101 may request (at 702) authorization for UE 107 to receive the particular service, and/or to receive particular QoS parameters associated with the particular service. In some embodiments, this request may be provided in the form of an explicit request to add authorization for UE 107 to receive QoS parameters associated with the particular service. Additionally, or alternatively, in some embodiments, this request may be provided in the form of a query, requesting information as to whether UE 107 is authorized to receive the QoS parameters associated with the particular service.

As similarly described above, NEF 103 may determine (at 704) that NEF 103 does not locally maintain (e.g., in data structure 201) information indicating that UE 107 is authorized for the particular service or a set of corresponding QoS parameters (e.g., a "cache miss"). Additionally, or alternatively, NEF 103 may determine (at 704) that UE 107 is not authorized for the particular service or set of QoS parameters. For example, while not explicitly shown, NEF 103 may query UDM 109 (or other suitable device or system) and may determine that UDM 109 also does not maintain information indicating that UE 107 is authorized for the particular service or set of corresponding QoS parameters, and/or that UDM 109 maintains information indicating that UE 107 is not authorized for the particular service or set of QoS parameters. In some embodiments, in the event that NEF 103 is not already subscribed for updates (e.g., from UDM 109) to information associated with UE 109, NEF 103 may subscribe (at 704) to updates to information associated with UE 109, as similarly discussed above.

In some embodiments, NEF 103 may request (at 706) authorization for the particular service or set of QoS parameters. Such request may be issued to provisioning system 111 or other suitable device or system. In some embodiments, provisioning system 111 may determine whether to grant the request based on any suitable criteria or methodology. For example, in some embodiments, provisioning system 111 may communicate with UE 107, SPS 101, an operator or administrator of wireless network 105, or other suitable entity, in order to grant authorization for UE 107 to receive the particular service or the set of QoS parameters that correspond to the service. In this example, assume that the authorization is granted. Accordingly, provisioning system 111 may notify (at 712) UDM 109 that UE 107 is authorized to receive the particular service (e.g., from SPS 101 and/or from some other source), and/or that UE 107 is authorized to receive a particular ser of QoS parameters associated with the particular service. UDM 109 may notify (at 710) NEF 103 that UE 107 is authorized for the particular service and/or the ser of corresponding QoS parameters. In some embodiments, the notification (at 710) may be based on a subscription by NEF 103 for such information, as discussed above.

NEF 103 may maintain and/or update authorization information associated with UE 107 (e.g., data structure 201), to indicate that UE 107 is authorized to receive the particular service and/or the corresponding set of QoS parameters, and may respond (at 714) to SPS 101 with an indication that UE 107 is authorized for the particular service and/or set of QoS parameters. As similarly discussed above, SPS 101 may maintain and/or update (at 716) information indicating that UE 107 is authorized to receive the particular service and/or the corresponding QoS parameters, and may accordingly configure and provide the service to UE 107 via wireless network 105.

Figure 8:
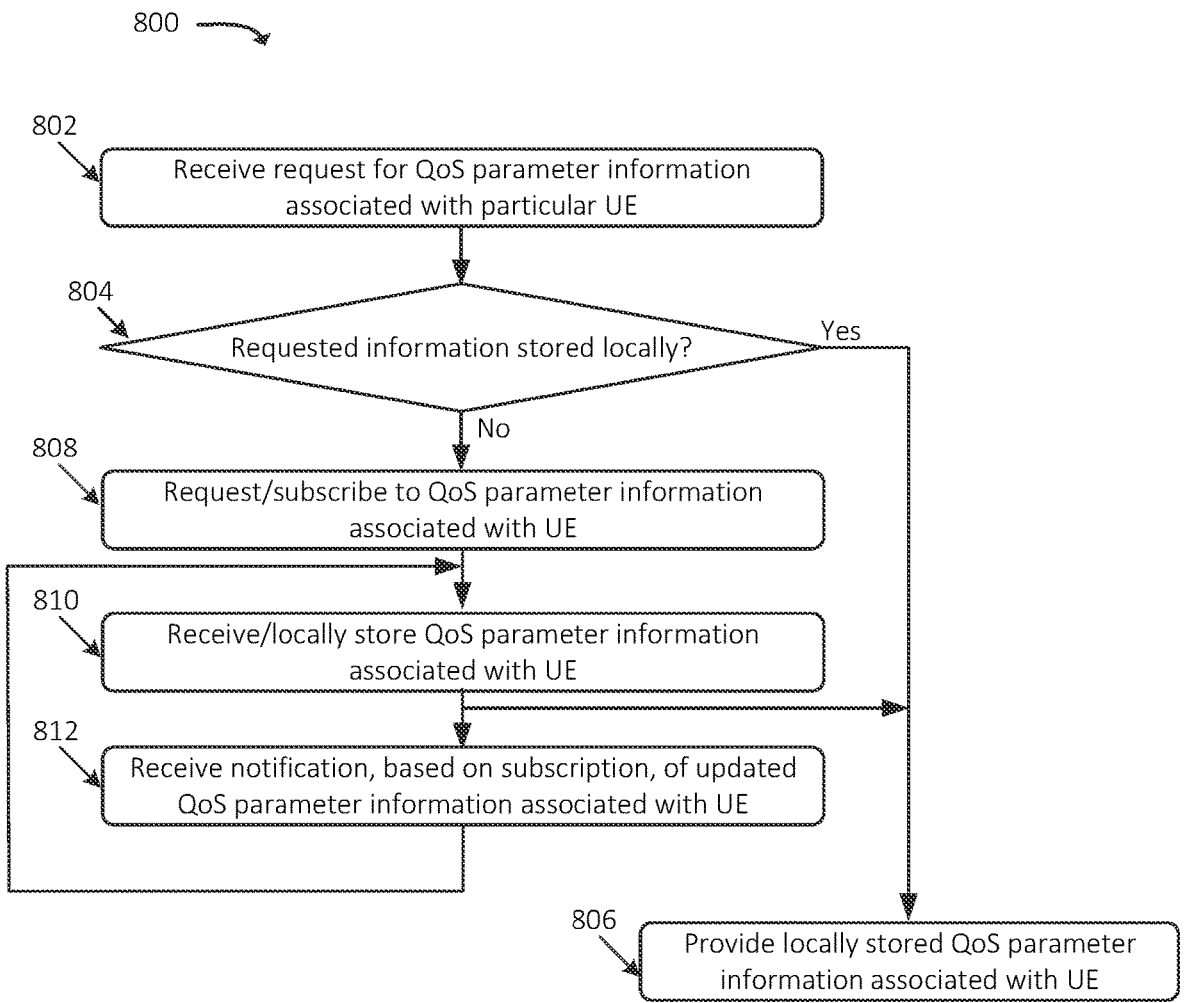
FIG. 8 illustrates an example process for dynamically caching and providing QoS parameter information associated with one or more UEs, in accordance with some embodiments.

FIG. 8 illustrates an example process 800 for dynamically caching and providing QoS parameter information associated with one or more UEs 107. In some embodiments, some or all of process 800 may be performed by NEF 103. In some embodiments, one or more other devices may perform some or all of process 800 in concert with, and/or in lieu of, NEF 103, such as a SCEF or other exposure element associated with a core of wireless network 105. Further, although operations described herein are discussed in the context of being performed by NEF 103, some or all of such operations may be performed by a device or system that is communicatively coupled to NEF 103. Such device or system may be communicatively coupled to NEF 103 via a communication pathway that is separate or otherwise different from a communication pathway between NEF 103 and UDM 109 and/or other elements of wireless network 105. For example, such device or system may be communicatively coupled to NEF 103 via a physical bus or interface (e.g., via an Ethernet port, via a network interface card ("NIC"), via a fiber cable, via a Serial Advanced Technology Attachment ("SATA") interface, etc.).

As shown, process 800 may include receiving (at 802) a request for QoS information associated with a particular UE 107. For example, NEF 103 may receive such a request from SPS 101 and/or some other suitable device or system. As discussed above, NEF 103 may authenticate the request in order to verify that SPS 101 is authorized to receive such information. The request may include an identifier of UE 107, such as an MDN, an IP address, an IMEI value, and/or other suitable identifier. In some embodiments, the request may include an identifier of a particular service or set of QoS parameters (e.g., a request to confirm whether UE 107 is authorized to receive the particular service or set of QoS parameters). On the other hand, in some embodiments, the request may include a request for a set of services or QoS parameters for which UE 107 is authorized.

Process 800 may further include determining (at 804) whether the requested information is stored locally. For example, NEF 103 may determine whether NEF 103 has previously received and/or otherwise maintains the requested information. For example, in some situations, NEF 103 may have previously received such information, such as based on a previous information request from SPS 101 and/or from some other source. As another example, NEF 103 may have been pre-populated with the information or may have received such information in accordance with some other procedure. As discussed above, the "local" maintaining of the information may include the capability of retrieving or otherwise identifying the requested information without requesting such information from a user information repository of a core of wireless network 105, such as UDM 109. Additionally, or alternatively, the "local" maintaining of the information may include the capability of retrieving or otherwise identifying the requested information without requesting such information via an SBI associated with an internal routing methodology of the core of the wireless network.

In the event that NEF 103 locally maintains the requested information (at 804—YES), then process 806 may include providing (at 806) the locally stored QoS parameter information associated with UE 107. For example, NEF 103 may provide the requested information, which may specify particular QoS parameters and/or services for which UE 107 is authorized to receive via wireless network 105. Additionally, or alternatively, as discussed above, NEF 103 may provide a binary response (e.g., either an affirmative or a negative response) when the request (at 802) requests whether UE 107 is authorized for a particular service or set of QoS parameters. NEF 103 may, for example, provide (at 806) the requested information to the same device or system from which the request was initially received (at 802), such as SPS 101.

If, on the other hand, NEF 103 does not locally maintain the requested information (at 804—NO), then process 800 may include requesting the QoS information associated with UE 107 from the user information repository of the core of wireless network 105 (e.g., UDM 109). Additionally, or alternatively, NEF 103 may subscribe to updated information associated with UE 107, such as information indicating particular services or sets of QoS parameters that UE 107 is authorized to receive via network 105. As discussed above, such information may further be granular or specific to different service provider systems. The subscribing may include indicating, to the user information repository (e.g., UDM 109) and/or to one or more other elements of wireless network 105 (e.g., one or more routing elements, one or more devices or systems that monitor UDM 109 or other elements for updates, etc.), that updated information associated with UE 107 and/or SPS 101 should be provided (e.g., "pushed") to NEF 103.

Process 800 may additionally include receiving and locally (at 810) the requested Qos parameter information associated with UE 107. For example, NEF 103 may receive the QoS parameter information based on requesting (at 808) such information from UDM 109. Once received (at 810), NEF 109 may further provide (at 806) the received and locally stored information to SPS 101.

Process 800 may also include receiving (at 812) a notification, based on the subscription, of updated QoS parameter information associated with UE 107. For example, UDM 109 may have received an update to such information from provisioning system 111 and/or some other suitable source, and may notify NEF 103 of the updated information. In such a circumstance, NEF 103 may receive and locally store (at 810) the updated information, and may provide (at 806) the updated information to SPS 101.

Figure 9:
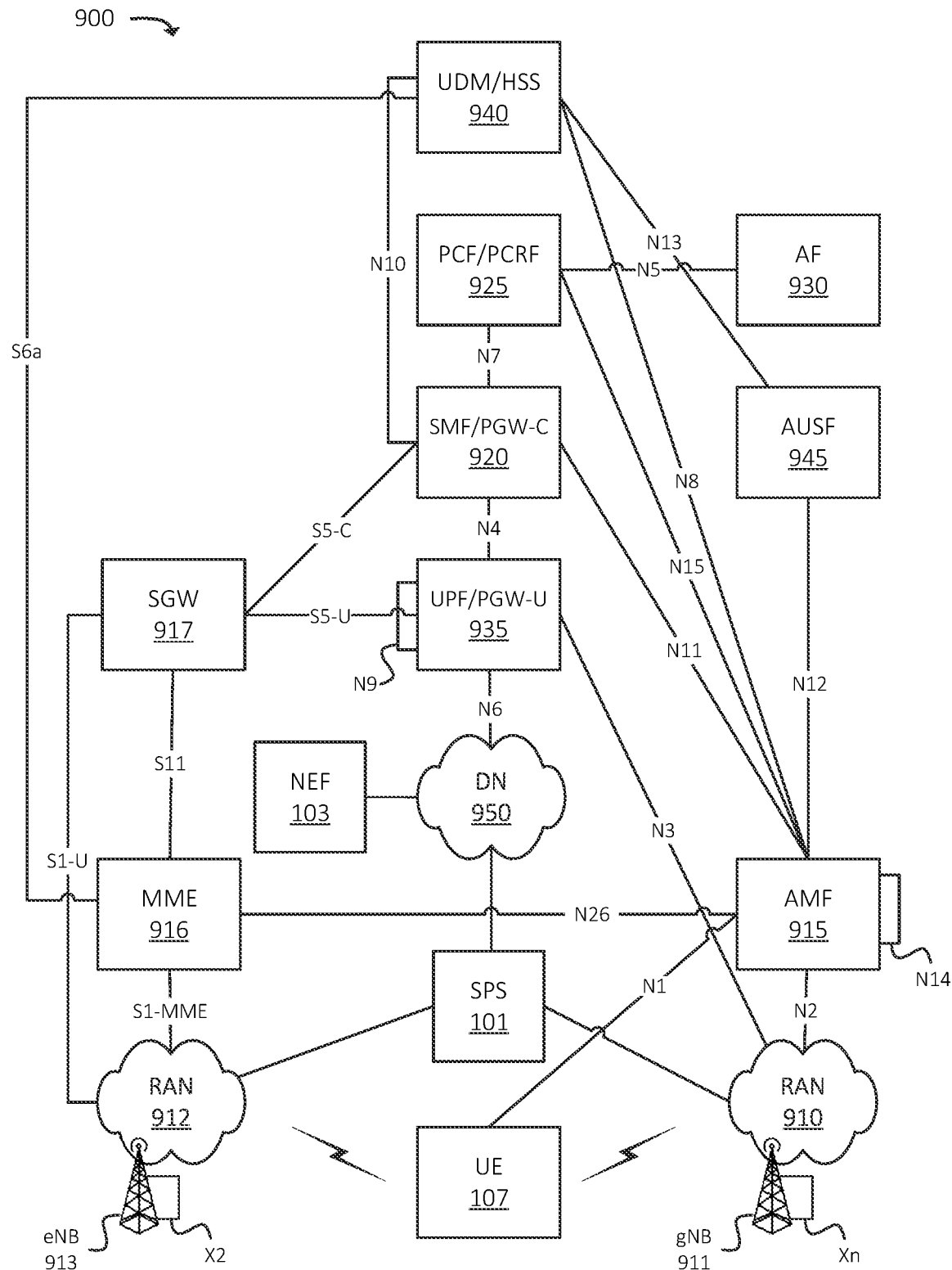
FIGS. 9 and 10 illustrate example environments in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 900 may represent or may include a 5G core ("5GC"). As shown, environment 900 may include UE 107, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, UDM/HSS 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as SPS 101, provisioning system 111, etc.

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of SMF/PGW-C 920, PCF/PCRF 925, UPF/PGW-U 935, UDM/HSS 940, and/or AUSF 945, while another slice may include a second instance of SMF/PGW-C 920, PCF/PCRF 925, UPF/PGW-U 935, UDM/HSS 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Elements of environment 900 may interconnect with each other and/or other devices via wired connections, wireless connections, or a combination of wired and wireless connections. Examples of interfaces or communication pathways between the elements of environment 900, as shown in FIG. 9, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 9, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 900 may be, may include, may be implemented by, and/or may be communicatively coupled to wireless network 105.

UE 107 may include a computation and communication device, such as a wireless mobile communication device that is capable of communicating with RAN 910, RAN 912, and/or DN 950. UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 107 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 107 may communicate with one or more other elements of environment 900. UE 107 may communicate with RAN 910 via an air interface (e.g., as provided by gNB 911). For instance, RAN 910 may receive traffic (e.g., user plane traffic such as voice call traffic, data traffic, messaging traffic, etc.) from UE 107 via the air interface, and may communicate the traffic to UPF/PGW-U 935 and/or one or more other devices or networks. Further, RAN 910 may receive signaling traffic, control plane traffic, etc. from UE 107 via the air interface, and may communicate such signaling traffic, control plane traffic, etc. to AMF 915 and/or one or more other devices or networks. Additionally, RAN 910 may receive traffic intended for UE 107 (e.g., from UPF/PGW-U 935, AMF 915, and/or one or more other devices or networks) and may communicate the traffic to UE 107 via the air interface.

RAN 912 may be, or may include, a LTE RAN that includes one or more base stations (e.g., one or more eNBs 913), via which UE 107 may communicate with one or more other elements of environment 900. UE 107 may communicate with RAN 912 via an air interface (e.g., as provided by eNB 913). For instance, RAN 912 may receive traffic (e.g., user plane traffic such as voice call traffic, data traffic, messaging traffic, signaling traffic, etc.) from UE 107 via the air interface, and may communicate the traffic to UPF/PGW-U 935 (e.g., via SGW 917) and/or one or more other devices or networks. Further, RAN 912 may receive signaling traffic, control plane traffic, etc. from UE 107 via the air interface, and may communicate such signaling traffic, control plane traffic, etc. to MME 916 and/or one or more other devices or networks. Additionally, RAN 912 may receive traffic intended for UE 107 (e.g., from UPF/PGW-U 935, MME 916, SGW 917, and/or one or more other devices or networks) and may communicate the traffic to UE 107 via the air interface.

AMF 915 may include one or more devices, systems, Virtualized Network Functions ("VNFs"), Cloud-Native Network Functions ("CNFs"), etc., that perform operations to register UE 107 with the 5G network, to establish bearer channels associated with a session with UE 107, to hand off UE 107 from the 5G network to another network, to hand off UE 107 from the other network to the 5G network, manage mobility of UE 107 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 107 with the EPC, to establish bearer channels associated with a session with UE 107, to hand off UE 107 from the EPC to another network, to hand off UE 107 from another network to the EPC, manage mobility of UE 107 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 107. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 107, from DN 950, and may forward the user plane data toward UE 107 (e.g., via RAN 910, SMF/PGW-C 920, and/or one or more other devices). In some embodiments, multiple UPFs 935 may be deployed (e.g., in different geographical locations), and the delivery of content to UE 107 may be coordinated via the N9 interface (e.g., as denoted in FIG. 9 by the line marked "N9" originating and terminating at UPF/PGW-U 935). Similarly, UPF/PGW-U 935 may receive traffic from UE 107 (e.g., via RAN 910, RAN 912, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. AUSF 945 and/or UDM/HSS 940 may perform authentication, authorization, and/or accounting operations associated with the subscriber and/or a communication session with UE 107. In some embodiments, UDM/HSS 940 may include, may implement, may be implemented by, and/or may otherwise be associated with UDM 109, a UDR, and/or some other suitable user information repository.

DN 950 may include one or more wired and/or wireless networks. For example, DN 950 may include an IP-based PDN, a wide area network ("WAN") such as the Internet, a private enterprise network, and/or one or more other networks. UE 107 may communicate, through DN 950, with data servers, other UEs 107, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 107 may communicate.

Figure 10:
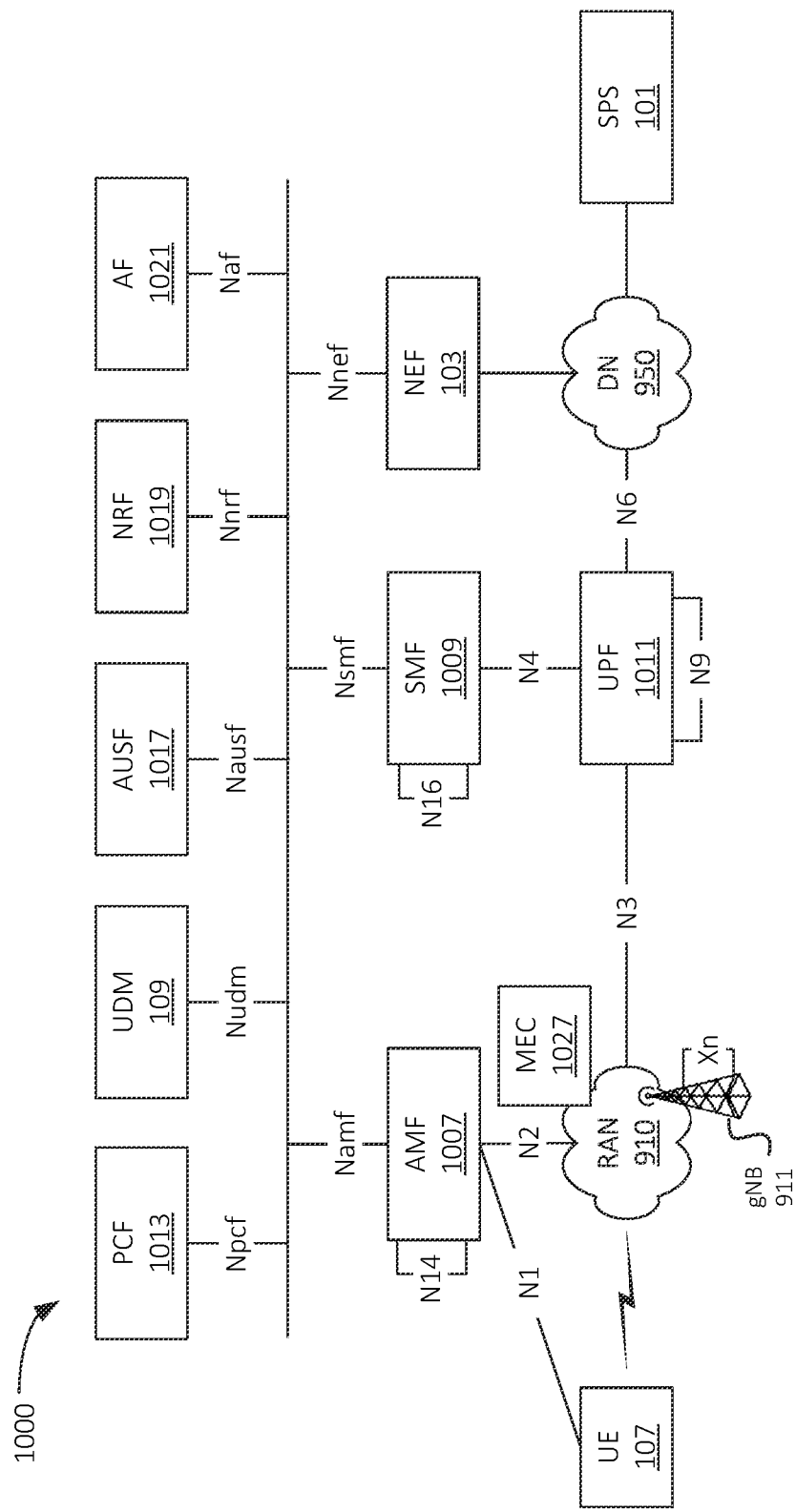

FIG. 10 illustrates another example environment 1000, in which one or more embodiments may be implemented. In some embodiments, environment 1000 may be represent some or all of the elements shown in FIG. 9. In some embodiments, environment 1000 may be a different environment than is shown in FIG. 9. In some embodiments, environment 1000 may correspond to a 5G network, and/or may include elements of a 5G network. In some embodiments, environment 1000 may correspond to a 5G Standalone ("SA") architecture, in which a 5G RAT may be used to provide a wireless interface between UE 107 and a core network, such as a 5GC. In some embodiments, environment 1000 may correspond to a 5G NSA architecture, in which a 5G RAT may be used in conjunction with one or more other RATs (e.g., an LTE RAT). In some embodiments, environment 1000 may include a 5GC, in which 5GC network elements perform one or more operations described herein. In some embodiments, environment 1000 may include, may implement, and/or may be implemented by a converged packet core, in which 5GC elements and elements of one or more other types of core networks (e.g., an EPC) may be implemented.

As shown, environment 1000 may include UE 107, RAN 910 (which may include one or more gNBs 911) and various network functions, which may be implemented as VNFs, CNFs, etc. Such network functions may include AMF 1007, SMF 1009, UPF 1011, PCF 1013, UDM 109, AUSF 1017, Network Repository Function ("NRF") 1019, AF 1021, and NEF 103. Environment 1000 may also include or may be communicatively coupled to one or more networks, such as DN 950. Environment 1000 may include one or more additional devices or systems communicatively coupled to one or more networks (e.g., DN 950), such as SPS 101.

The example shown in FIG. 10 illustrates one instance of each network component or function (e.g., one instance of SMF 1009, UPF 1011, PCF 1013, UDM 109, AUSF 1017, etc.). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF 1009, PCF 1013, UPF 1011, etc., while another slice may include a second instance of SMF 1009, PCF 1013, UPF 1011, etc.). Additionally, or alternatively, one or more of the network functions of environment 1000 may implement multiple network slices. The different slices may provide differentiated levels of service, such as service in accordance with different QoS parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. In some implementations, one or more devices of environment 1000 may be physically integrated in, and/or may be physically attached to, one or more other devices of environment 1000. Alternatively, or additionally, one or more of the devices of environment 1000 may perform one or more network functions described as being performed by another one or more of the devices of environment 1000.

Elements of environment 1000 may interconnect with each other and/or other devices via wired connections, wireless connections, or a combination of wired and wireless connections. Examples of interfaces or communication pathways between the elements of environment 1000, as shown in FIG. 10, may include interfaces shown in FIG. 10 and/or one or more interfaces not explicitly shown in FIG. 10. In some embodiments, one or more elements of environment 1000 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 1007), an Nudm interface (e.g., indicating communications to be routed to UDM 109), an Npcf interface, an Nupf interface, an Nnef interface, an Nsmf interface, an Nnrf interface, an Naf interface, and/or one or more other SBIs. In some embodiments, environment 1000 may be, may include, may be implemented by, and/or may be communicatively coupled to wireless network 105.

Figure 11:
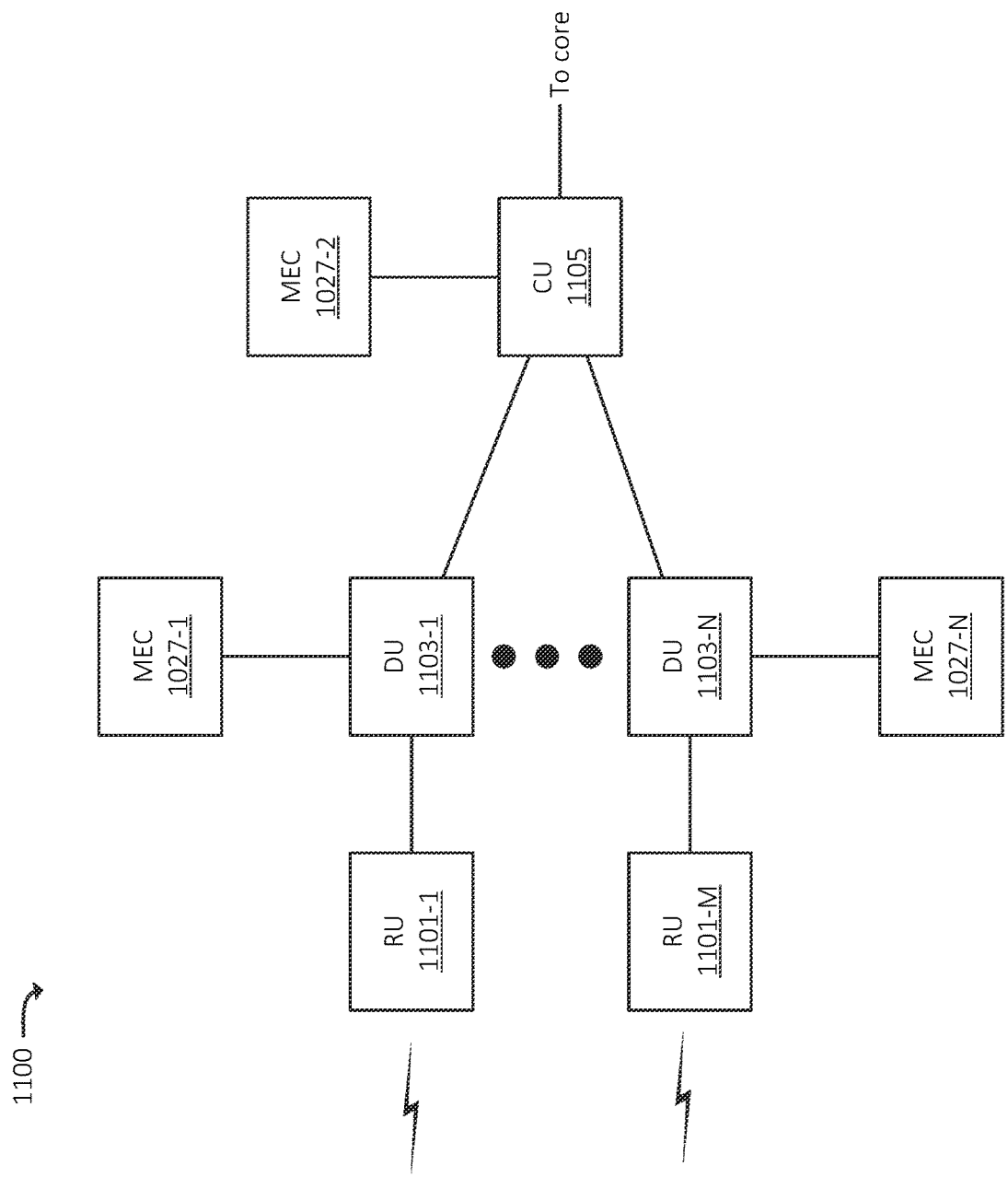
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 910, RAN 912, or some other RAN). In some embodiments, a particular RAN may include one RAN environment 1100. In some embodiments, a particular RAN may include multiple RAN environments 1100. In some embodiments, RAN environment 1100 may correspond to a particular gNB 911 of a 5G RAN (e.g., RAN 910). In some embodiments, RAN environment 1100 may correspond to multiple gNBs 911. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 107 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 107, and may determine which DU(s) 1103 should receive the downlink traffic. DU 1103 may include one or more devices that transmit traffic between a core network (e.g., via CU 1105) and UE 107 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 107.

RU 1101 may include hardware circuitry (e.g., one or more RF transceivers, antennas, radios, and/or other suitable hardware) to communicate wirelessly (e.g., via an RF interface) with one or more UEs 107, one or more other DUs 1103 (e.g., via RUs 1101 associated with DUs 1103), and/or any other suitable type of device. In the uplink direction, RU 1101 may receive traffic from UE 107 and/or another DU 1103 via the RF interface and may provide the traffic to DU 1103. In the downlink direction, RU 1101 may receive traffic from DU 1103, and may provide the traffic to UE 107 and/or another DU 1103.

One or more elements of RAN environment 1100 may, in some embodiments, be communicatively coupled to one or more Multi-Access/Mobile Edge Computing ("MEC") devices, referred to sometimes herein simply as "MECs" 1027. For example, DU 1103-1 may be communicatively coupled to MEC 1027-1, DU 1103-N may be communicatively coupled to MEC 1027-N, CU 1105 may be communicatively coupled to MEC 1027-2, and so on. MECs 1027 may include hardware resources (e.g., configurable or provisionable hardware resources) that may be configured to provide services and/or otherwise process traffic to and/or from UE 107, via a respective RU 1101.

For example, DU 1103-1 may route some traffic, from UE 107, to MEC 1027-1 instead of to a core network via CU 1105. MEC 1027-1 may process the traffic, perform one or more computations based on the received traffic, and may provide traffic to UE 107 via RU 1101-1. In some embodiments, MEC 1027 may include, and/or may implement, some or all of the functionality described above with respect to SPS 101, provisioning system 111, AF 930, UPF 935, and/or one or more other devices, systems, VNFs, CNFs, etc. In this manner, ultra-low latency services may be provided to UE 107, as traffic does not need to traverse DU 1103, CU 1105, links between DU 1103 and CU 1105, and an intervening backhaul network between RAN environment 1100 and the core network.

Figure 12:
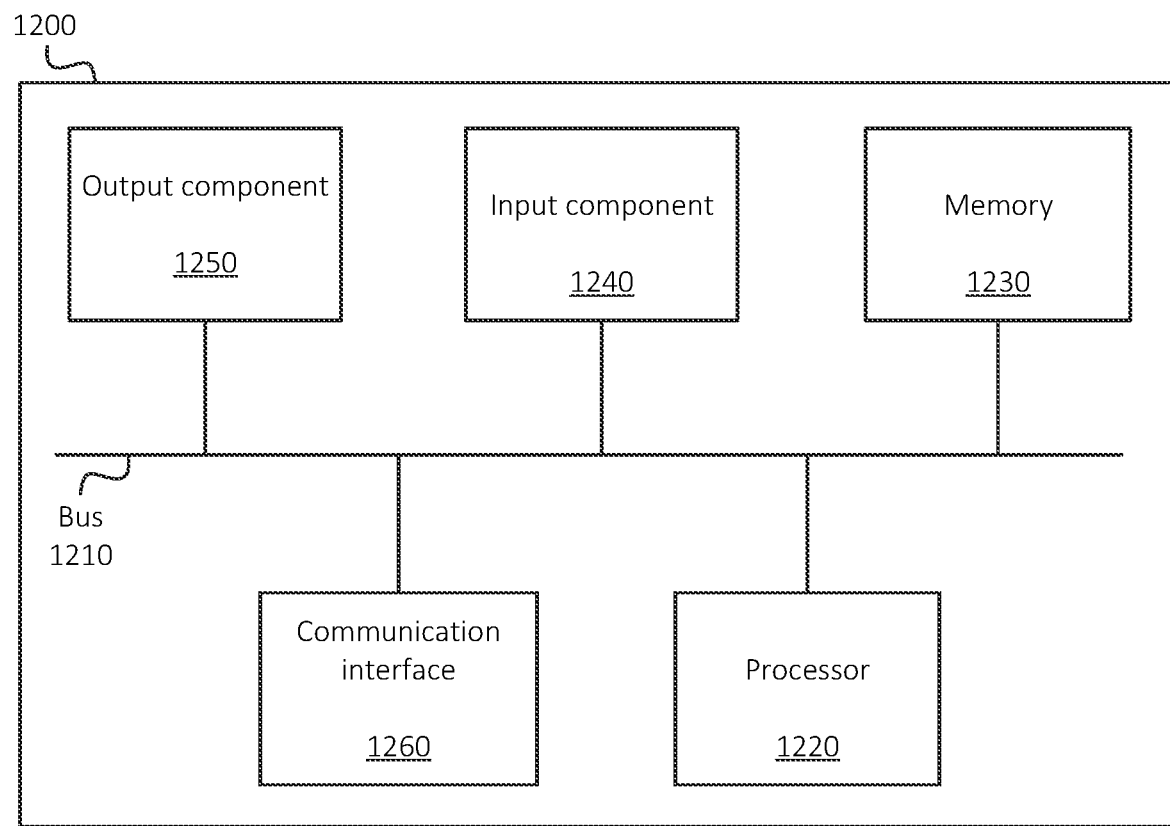
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to input component 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      receive a first request for Quality of Service ("QoS") parameter information associated with a particular User Equipment ("UE");
      obtain, from a user information repository of a wireless network, particular QoS parameter information associated with the particular UE;
      cache the obtained particular QoS parameter information associated with the particular UE;

respond to the first request, wherein the responding to the first request includes outputting the particular QoS parameter information associated with the particular UE;

receive a second request for QoS parameter information associated with the particular UE;

identify the cached particular QoS parameter information associated with the particular UE, without performing a repeated iteration of obtaining the particular QoS parameter information from the user information repository; and respond to the second request, wherein responding to the second request includes outputting the particular QoS parameter information associated with the particular UE.

2. The device of claim 1, wherein receiving the first request for the QoS parameter information and outputting the particular QoS parameter information are performed by an exposure element of a core of the wireless network.

3. The device of claim 2, wherein the exposure element includes at least one of:
a Network Exposure Function ("NEF"), or
a Service Capability Exposure Function ("SCEF").

4. The device of claim 1, wherein the first request includes an identifier of the particular UE, wherein the indicating, to the user information repository, includes providing the identifier of the particular UE to the user information repository.

5. The device of claim 1, wherein obtaining the QoS parameter information from the user information repository includes subscribing to updates to the QoS parameter information associated with the particular UE, as received by the user information repository.

6. The device of claim 1, wherein the user information repository includes at least one of:
a Unified Data Management function ("UDM"),
a Unified Data Repository ("UDR"), or
a Home Subscriber Server ("HSS").

7. The device of claim 1, wherein the QoS parameter information includes at least one of:
a network slice identifier,
a maximum latency threshold, or
a minimum throughput threshold.

8. A non-transitory computer-readable medium, storing a plurality of processor-executable instructions to:
receive a first request for Quality of Service ("QoS") parameter information associated with a particular User Equipment ("UE");
obtain, from a user information repository of a wireless network, particular QoS parameter information associated with the particular UE;
cache the obtained particular QoS parameter information associated with the particular UE;
respond to the first request, wherein the responding to the first request includes outputting the particular QoS parameter information associated with the particular UE;
receive a second request for QoS parameter information associated with the particular UE;
identify the cached particular QoS parameter information associated with the particular UE, without performing a repeated iteration of obtaining the particular QoS parameter information from the user information repository; and
respond to the second request, wherein responding to the second request includes outputting the particular QoS parameter information associated with the particular UE.

9. The non-transitory computer-readable medium of claim 8, wherein receiving the first request for the QoS parameter information and outputting the particular QoS parameter information are performed by an exposure element of a core of the wireless network.

10. The non-transitory computer-readable medium of claim 9, wherein the exposure element includes at least one of:
a Network Exposure Function ("NEF"), or
a Service Capability Exposure Function ("SCEF").

11. The non-transitory computer-readable medium of claim 8, wherein the first request includes an identifier of the particular UE, wherein the indicating, to the user information repository, includes providing the identifier of the particular UE to the user information repository.

12. The non-transitory computer-readable medium of claim 8, wherein obtaining the QoS parameter information from the user information repository includes subscribing to updates to the QoS parameter information associated with the particular UE, as received by the user information repository.

13. The non-transitory computer-readable medium of claim 8, wherein the user information repository includes at least one of:
a Unified Data Management function ("UDM"),
a Unified Data Repository ("UDR"), or
a Home Subscriber Server ("HSS").

14. The non-transitory computer-readable medium of claim 8, wherein the QoS parameter information includes at least one of:
a network slice identifier,
a maximum latency threshold, or
a minimum throughput threshold.

15. A method, comprising:
receiving a first request for Quality of Service ("QoS") parameter information associated with a particular User Equipment ("UE");
obtaining, from a user information repository of a wireless network, particular QoS parameter information associated with the particular UE;
caching the obtained particular QoS parameter information associated with the particular UE;
responding to the first request, wherein the responding to the first request includes outputting the particular QoS parameter information associated with the particular UE;
receiving a second request for QoS parameter information associated with the particular UE;
identifying the cached particular QoS parameter information associated with the particular UE, without performing a repeated iteration of obtaining the particular QoS parameter information from the user information repository; and
responding to the second request, wherein responding to the second request includes outputting the particular QoS parameter information associated with the particular UE.

16. The method of claim 15, wherein receiving the first request for the QoS parameter information and outputting the particular QoS parameter information are performed by at least one of:
a Network Exposure Function ("NEF") of a core of the wireless network, or
a Service Capability Exposure Function ("SCEF") of the core of the wireless network.

17. The method of claim 15, wherein the first request includes an identifier of the particular UE, wherein obtaining the QoS parameter information from the user information repository includes subscribing to updates to the QoS parameter information associated with the particular UE, as received by the user information repository.

18. The method of claim 15, wherein the indicating, to the user information repository, includes subscribing to updates to the QoS parameter information associated with the particular UE, as received by the user information repository.

19. The method of claim 15, wherein the user information repository includes at least one of:
- a Unified Data Management function ("UDM"),
- a Unified Data Repository ("UDR"), or
- a Home Subscriber Server ("HSS").

20. The method of claim 15, wherein the QoS parameter information includes at least one of:
- a network slice identifier,
- a maximum latency threshold, or
- a minimum throughput threshold.

* * * * *